United States Patent
Azuma et al.

(10) Patent No.: US 7,643,323 B2
(45) Date of Patent: *Jan. 5, 2010

(54) POWER CONVERTER

(75) Inventors: Katsunori Azuma, Chiyoda-ku (JP);
Akira Mishima, Chiyoda-ku (JP);
Takashi Kaneko, Chiyoda-ku (JP);
Masaomi Konishide, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/905,745

(22) Filed: Oct. 3, 2007

(65) Prior Publication Data

US 2008/0212349 A1  Sep. 4, 2008

Related U.S. Application Data

(63) Continuation of application No. 10/894,049, filed on Jul. 20, 2004, now Pat. No. 7,317,626.

(30) Foreign Application Priority Data

Sep. 9, 2003  (JP) .............................. 2003-316147

(51) Int. Cl.
*H02M 1/00* (2007.01)
(52) U.S. Cl. ..................................... 363/144; 363/141

(58) Field of Classification Search ................. 363/141, 363/144, 39; 323/205, 208; 307/89, 326, 307/327, 98, 105; 439/164; 174/562; 315/308
See application file for complete search history.

(56) References Cited

U.S. PATENT DOCUMENTS

| 5,229,544 | A | 7/1993 | Horiuchi et al. | |
| 6,838,838 | B2 * | 1/2005 | Okamoto et al. | 315/308 |
| 7,042,198 | B2 * | 5/2006 | Mutoh | 323/205 |
| 7,317,626 | B2 * | 1/2008 | Azuma et al. | 363/144 |
| 2003/0222605 | A1 | 12/2003 | Okamoto et al. | |

FOREIGN PATENT DOCUMENTS

| JP | 10-313501 | 11/1998 |
| JP | 2002-136153 | 5/2002 |
| JP | 2002-186184 | 6/2002 |
| JP | 2002-354840 | 12/2002 |

* cited by examiner

*Primary Examiner*—Jessica Han
(74) *Attorney, Agent, or Firm*—Crowell & Moring LLP

(57) ABSTRACT

A power converter of the present invention is connected between a direct current power source and controls power to a load by switching equipment. The converter is equipped with a first conductor for connecting a negative pole of the power converter and the switching equipment, and a second conductor for connecting a housing of the power converter and the negative pole of the power converter to the first conductor through a resistor.

11 Claims, 6 Drawing Sheets

POWER CONVERTER

This application is a continuation of U.S. patent application Ser. No. 10/894,049 filed Jul. 20, 2004, which claims priority to Japanese patent application Serial No. JP2003/316147 filed Sep. 9, 2003, the entire disclosures of which are herein incorporated in their entireties.

BACKGROUND OF THE INVENTION

1. Field of the Invention

The present invention relates to a power converter, which is connected between a power source and a load, converts a direct current to an alternate current by a plurality of switching elements, performs an inverse conversion thereof, and thereby controls power to the load; and particularly, a technology for reducing an electromagnetic wave interference generated in operation of the switching elements.

2. Description of the Related Art

In a power converter, based upon a high voltage resistance and high speed of a switching element such as an IGBT (Insulated Gate Bipolar Transistor), a switching voltage increases, a high frequency of a frequency proceeds, and an efficiency improvement and a cost reduction proceed. Generally, it is known that a switching of the power converter derives a current leaking to the earth called a common mode current through a parasitic capacitance among a load and power source, which are connected to the power converter, an electric wire for connecting those, and the earth. In addition, also in an electronic component of inside of the power converter, a switching resonates a parasitic capacitance between component housings or between a parasitic capacitance of the component housings and a power converter housing and a parasitic inductance of wiring due to a fluctuation of an electric potential in an inner conductor by the switching; it becomes a leak noise for an outside; and thereby causes an electromagnetic interference of external appliances.

Also in a case of an electric vehicle for a railway a switching of an inverter (power converter) causes an induced interference for a train wireless apparatus and signaling apparatuses, and a radio audible interference. In the electric vehicle for the railway the switching of switching equipment for driving a motor leaks a high-frequency current through a motor wire and a motor parasitic capacitance.

Conventionally, as one example, a means for solving this problem inserts a choke core filter, which uses a magnetic core, in a motor wire, makes an impedance of the motor wire become higher as a frequency becomes higher, and thereby reduces a leak high frequency.

In addition, as described in Japanese Patent Laid-Open Publication Hei 10-313501, even when grounding a housing of a power converter to a current collector of a negative pole, grounding the housing to a vehicle body, and concentrating a high-frequency current in vicinity of the housing of the power converter, the induced interference is reduced by connecting a resistor between the vehicle body and an earth brush and thus recovering the high-frequency current with passing it through the vehicle body. This uses a fact that a wiring inductance of the vehicle body is small, comparing a wiring inductance of a main circuit electric wire with that of the vehicle body. It is possible to suppress the induced interference to a wireless apparatus and the signaling apparatuses by positively recovering the high-frequency current and suppressing a potential fluctuation of a switching circuit of the power converter, the housing of the power converter, and the vehicle body, which fluctuation is due to the high-frequency current passing the wiring inductance of the main circuit electric wire.

Furthermore, as described in Japanese Patent Laid-Open Publication 2002-136153, taking notice of the parasitic capacitance of a module within switching equipment connected to cooling equipment and making a bypass circuit of the high-frequency current, there is a method of blocking the high-frequency current within a housing of the power converter. In FIG. 2 is enlargedly shown a housing portion. Cooling equipment thermally contacts switching equipment to radiate heat of a switching element within a switch module. Therefore, the cooling equipment results in being connected to a motor wire through the parasitic capacitance of the module. Then some percent of high-frequency currents passing the motor wire can be recovered as a high-frequency current by connecting the cooling equipment and a negative pole terminal of the power converter through a conducting wire and a resistor. Thus it is possible to suppress the induced interference.

Even applying the conventional technologies described above, it is not sufficient to suppress the induced interference of signaling apparatuses, which use a frequency of not less than 1 MHz, and the radio audible interference within a vehicle.

When using a choke coil, there are frequency characteristics in a magnetic core used for the choke coil and the characteristics drastically degenerates in the frequency of not less than 1 MHz. In addition, because a material amount of the magnetic core for making a necessary inductance increases, there is a problem that a cost and a space increase.

Because when connecting a resistor between a vehicle body and an earth brush, a high-frequency current flows in the vehicle body, it results in giving interference to a radio audibility within the vehicle.

Next, taking notice of the parasitic capacitance, a method, which connects cooling equipment and an inverter negative pole terminal with using a conducting wire, may delay a voltage change speed of a switching to some extent and lessen the high-frequency current. However, if because an inner impedance is small within a voltage source where a noise source is a pulse form, a bypass circuit of a low impedance is provided in parallel with a motor wire and a parasitic capacitance circuit, it does not almost influence on the high-frequency current flowing in the motor wire and the parasitic capacitance circuit although the high-frequency current flows in the bypass circuit depending on the impedance. The current rather results in flowing in the bypass circuit of the low impedance, and it results in forming a new high-frequency current circuit. That is, the induced interference and the radio audible interference cannot be suppressed.

Subsequently, is strongly requested a power converter, which can suppress the induced interference and the radio audible interference by not leaking a high frequency current of the power converter outside, based upon a switching of switching equipment, and being able to recover the high frequency current in a short path through a low impedance path

SUMMARY OF THE INVENTION

The present invention solves the problem described above by next means:

A power converter, which is connected between a direct current (DC) power source and controls power to a load by switching equipment, provides a second conductor, which connects a housing of the power converter and a negative pole of the power converter through a resistor, at a first conductor, which connects the negative pole of the power converter and the switching equipment; and for example, the power converter provides the second conductor of a conductor for a small current in an isolation state along the first conductor.

Further, to be more precise, a connection position of the housing of the power converter is provided adjacent to a filter condenser within the housing. Expecting a high-frequency current path from a connection position of the negative poles of the power converter and the switching equipment, and a wiring to an inverter circuit within an inverter housing, is provided a wiring configuration of making the wiring abut a wiring conductor from the negative pole terminal of the power converter through an isolator so as to become a low inductance wiring.

DESCRIPTION OF THE MOST PREFERRED EMBODIMENTS

In the present invention a power converter, which is connected between a DC power source and controls power to a load by switching equipment, is configured of providing a second conductor, which connects a housing and negative pole of the power converter through a resistor, at a first conductor, which connects the negative pole of the power converter and the switching equipment; and arranging the second conductor adjacent to the first conductor so that a parasitic inductance of the second conductor couples that of the first conductor.

Embodiment 1

Figure 1:
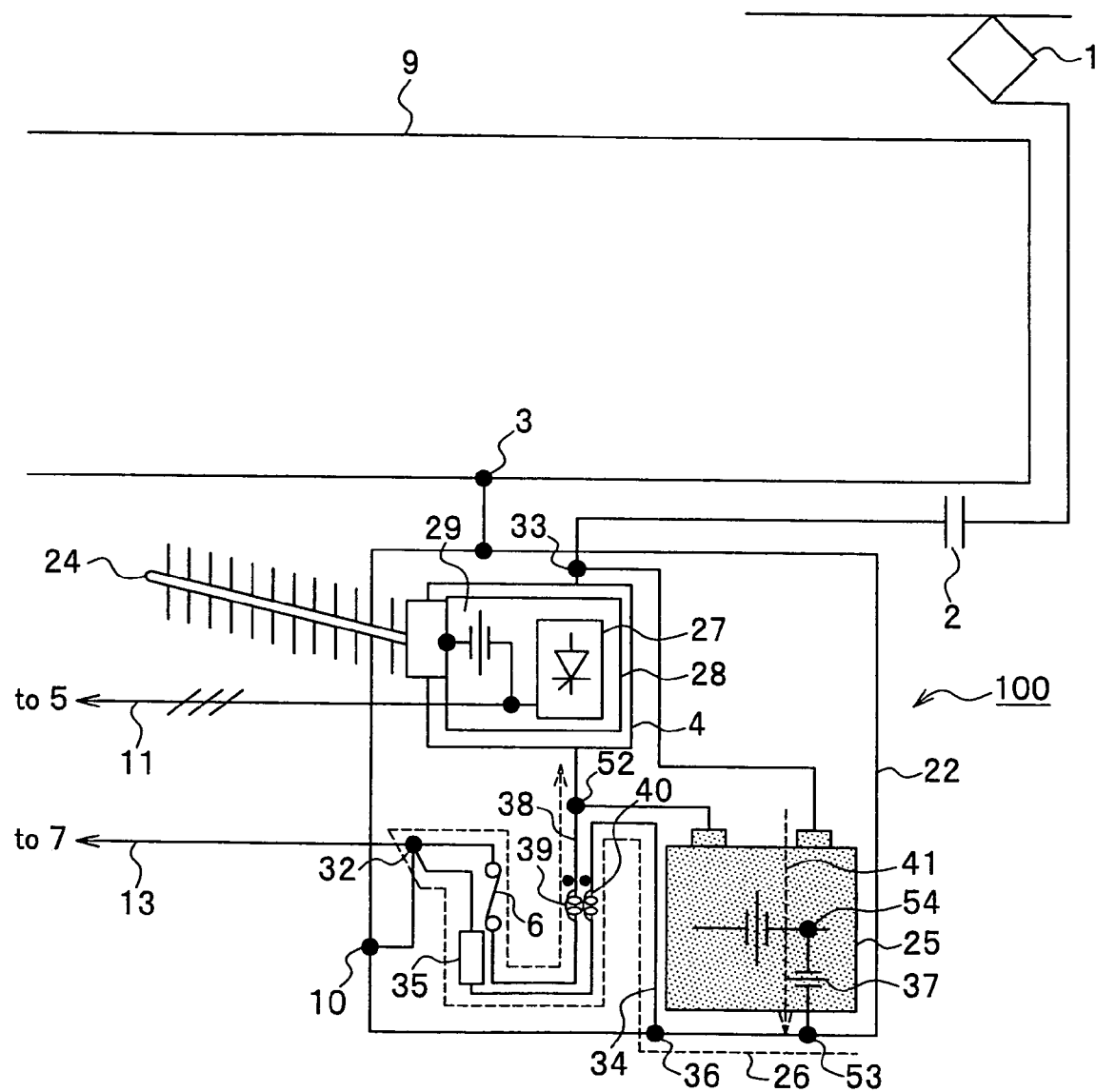
FIG. 1 is a drawing showing a first embodiment of the present invention.

Here will be described embodiments of the present invention, based on drawings.
FIG. 1 shows a first embodiment of the present invention, and shows a power converter 100 that uses switching equipment in an inverter electric vehicle of a DC power supply. In FIG. 1 a positive pole terminal of the power converter 100 adds a DC voltage through a current collector 1 of a vehicle body 9 and a switch 2; a negative pole terminal 32 of the power converter 100 is grounded to the earth through a main circuit electric wire 13 and an earth brush (not shown) and performs the DC power supply to the power converter 100. The power converter 100 comprises switching equipment 4 configured of a switching module 28; cooling equipment 24 abutting the switching module 28; a filter condenser 25, which is connected in parallel with a positive terminal 33 of the switching equipment 4 and a connection point 52 of a negative pole of the switching equipment 4; a busbar 38 of an electric conductor for a large current, which busbar 38 connects the connection point 52 and the negative terminal 32 of the power converter 100; and a grounding switch 6. The switching equipment 4 comprises the module 28 for housing a switching element 27 and is connected to an external motor 5 (not shown) through a motor wire 11. In this configuration the power converter 100, which uses the switching element 27, efficiently converts DC to AC (alternate current) and supplies power to the motor 5.

Meanwhile, the switching module 28 comprises a pair or plurality of an insulated gate bipolar transistor (IGBT), a gate turn-off thyristor (GTO), the switching element 27 of self-arc extinguish such as a bipolar transistor, and a freewheel diode connected in reverse-parallel therewith.

A module comprises two metal plates: one face of the module is configured of one metal plate such as copper, which is high in heat conductivity, for radiation; on the other metal plate within the module there is the switching element 27. The switching equipment 4 have a structure, which comprises one or a plurality of switching modules 28, abuts a metal surface for radiation of all modules with the cooling equipment 24, and cools a heat generating element in switching.

Most of the cooling equipment 24 is exposed outside a housing 22 of the power converter 100 for air cooling.

The housing 22 of the power converter 100 is connected to the earth at a grounding position 10 together with the negative pole terminal 32 of the power converter 100.

Here, a connection point 36 is separately provided at the housing 22 of the power converter 100. And the negative pole terminal 32 of the power converter 100 and the connection point 36 are electrically connected through a conducting wire 34 of a conductor for a small current and a resistor 35. A position of the connection point 36 of the housing 22 is made adjacent to the filter condenser 25. In addition, the conducting wire 34 of a connection wire is wired with abutting the busbar 38 so as to become a low impedance for a high-frequency current path expected from a wiring within the housing 22. At this time in order to prevent the busbar 38 and the conducting wire 34 from electrically being contacted on the way, they abut each other through an insulator.

As described later, a recovery of a high-frequency current noise due to a switching of the switching element 27 is realized and the electromagnetic interference for external appliances can be suppressed by electrically connecting the housing 22 and the negative pole terminal 32 at a power-source side of the power converter 100 through the resistor 35 and making it a low inductance wiring.

The housing 22 is connected to a vehicle 9 at a vehicle body grounding 3.

Figure 10:
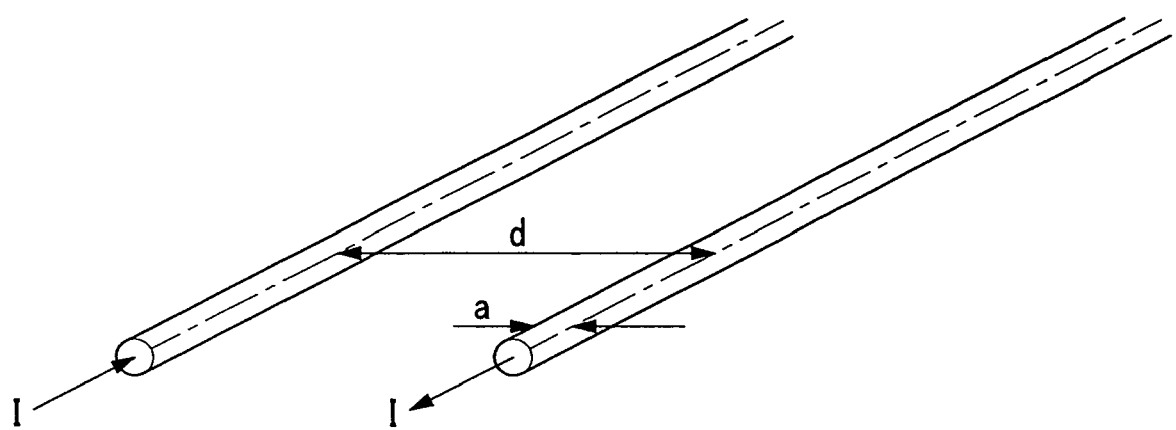
FIG. 10 is a drawing illustrating inductance coupling.

One of features of the embodiment exists in connecting the housing connection point 36 adjacent to the filter condenser 25 and the negative pole terminal 32 with using the conducting wire 34 through the resistor 35, and wiring the conducting wire 34 so as to abut the busbar 38, which connects the negative pole terminal 32 and the switching equipment 4. In the embodiment a parasitic inductance 39 of the busbar 38 and a parasitic inductance 40 of the conducting wire 34 are coupled for a path of the high-frequency current 26, which passes the busbar 38 and returns to the switching equipment 4 by making wiring so that the busbar 38 and the conducting wire 34 abut each other. Here will be described an inductance coupling. Simplifying the busbar 38 and the conducting wire 34, think a case that infinite parallel conducting wires (section diameter, a) have a distance d as shown in FIG. 10 and respective currents are in opposite directions. An inductance which these conductors make per a unit length is expressed as: $L=\mu o/4\pi+\mu o/\pi \times \log((d-a)/a)$, where $\mu o$ is vacuum permeability. From this equation, it turns out that if the distance d between the busbar 38 and the conduction wire 34 becomes smaller, the inductance thereof becomes smaller. That is, if a distance between the busbar 38 and the conduction wire 34 is small, respective inductances are coupled and thereby an inductance becomes small for a current of a to and fro path. Because a path, which detours till a frame ground 10, is large in distance for the high-frequency current 26, an inductance thereof is large; whereas, another path passing the conducting wire 34 results in a low impedance and can recover the high-frequency current 26, which flows in the inverter housing 22, with making the high-frequency current 26 flow in an arrow mark direction through the conducting wire 34. Here, calculate an impedance for the path of the high-frequency current 26. Providing that a length of the busbar 38 is 2 meters and an inductance per a unit length is 1 μH/m, an inductance thereof becomes 2 μH. Then, an impedance Z1 at a frequency of 1 MHz of the busbar 38 becomes:

$$Z1=2\times\pi\times1\times10^6\times2\times10^{-6}\approx 12.5\ \Omega.$$

Providing that a coupling coefficient of the parasitic inductance 39 of the busbar 38 and the parasitic inductance 40 of the conducting wire 34 is 0.8 and an impedance of the resistor 35 is 1Ω, an impedance Z2 of a path passing the conducting wire 34 becomes not more than a half thereof:

$$Z2=12.5\times(1-0.8)+1\approx 3.5\ \Omega.$$

If further heightening the frequency and the coupling coefficient, most of high-frequency currents results in flowing in the conducting wire 34.

In addition, if coupling the parasitic inductance 39 of the busbar 38 and the parasitic inductance 40 of the conducting wire 34, other high-frequency currents flowing in the busbar 38 can also be recovered through the conducting wire 34. For example, a high-frequency current 41, which leaks to the housing 22 of the power converter 100 by a parasitic capacitance 37 of the filter condenser 25, can similarly be recovered through the conducting wire 34. The high-frequency current 41 can be recovered without unnecessarily running around the housing 22 of the power converter 100 by making the connection point 36 of the conducting wire 34 adjacent to the filter condenser 25. In short, can be shortened a path where the high-frequency current 41 flows in the housing 22.

Embodiment 2

Figure 2:
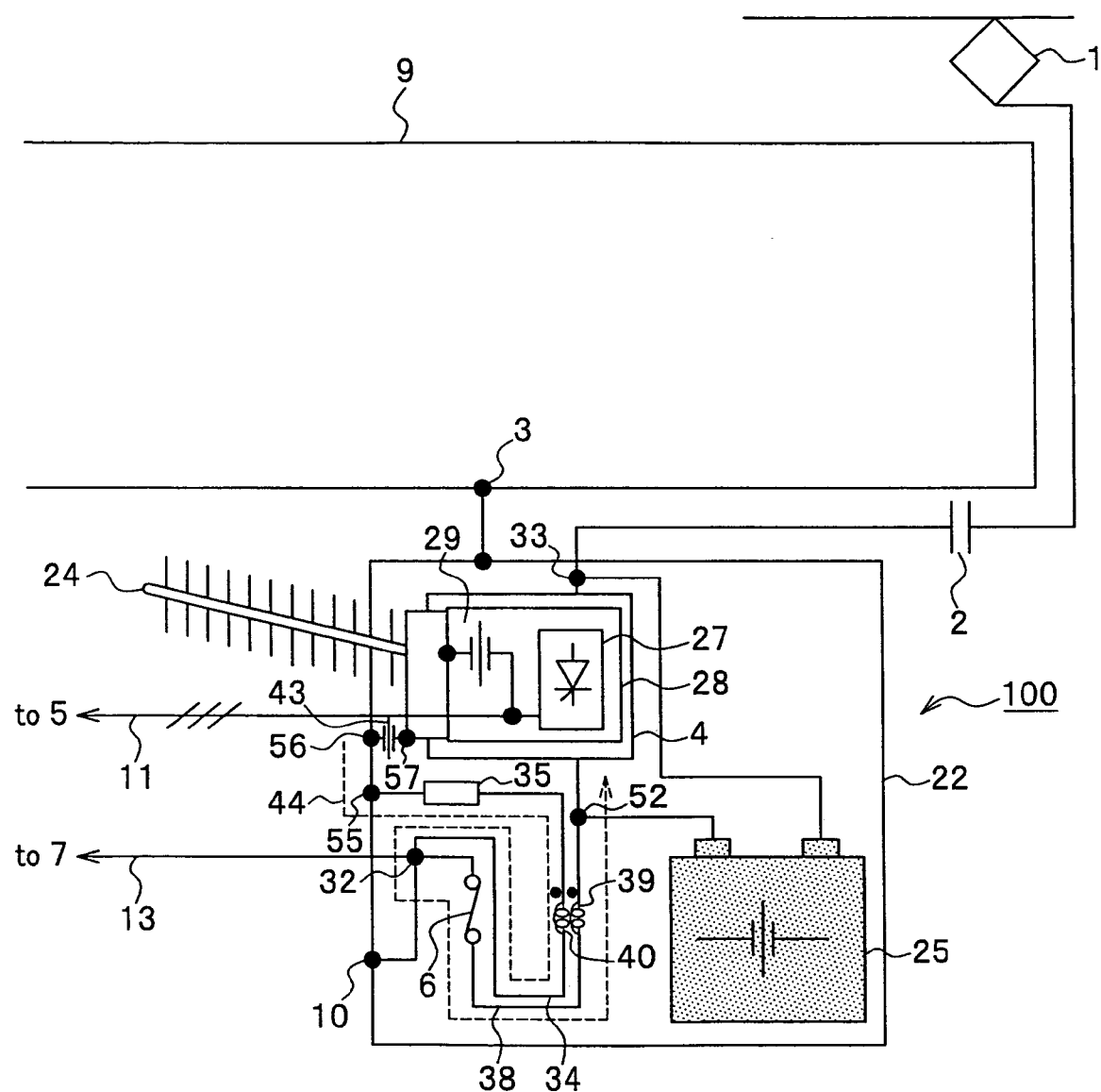
FIG. 2 is a drawing showing a second embodiment of the present invention.

FIG. 2 shows a second embodiment of the present invention. A point different from the example shown in FIG. 1 will be centrally described. The point different from FIG. 1 is one that a connection point 42 of the housing 22, which is adjacent to the switching equipment 24, and negative pole terminal 32 of the power converter 100 are connected with using the resistor 35 and the conducting wire 34. Make wiring so that the conducting wire 34 abuts the busbar 38, couple the parasitic inductance 39 of the busbar 38 and the parasitic inductance 40 of the conducting wire 34, and thereby make it a low impedance for a current of a to and fro path. Thus as described before, can be recovered a high-frequency current 44, which leaks to the cooling equipment 24 by a parasitic inductance 29 within a module and further leaks by a parasitic inductance 43 between the cooling equipment 24 and the housing 22, in an arrow mark direction through a connection point 55 of the housing 22 adjacent to the cooling equipment 24, the conducting wire 34, and the resistor 35.

Embodiment 3

Figure 3:
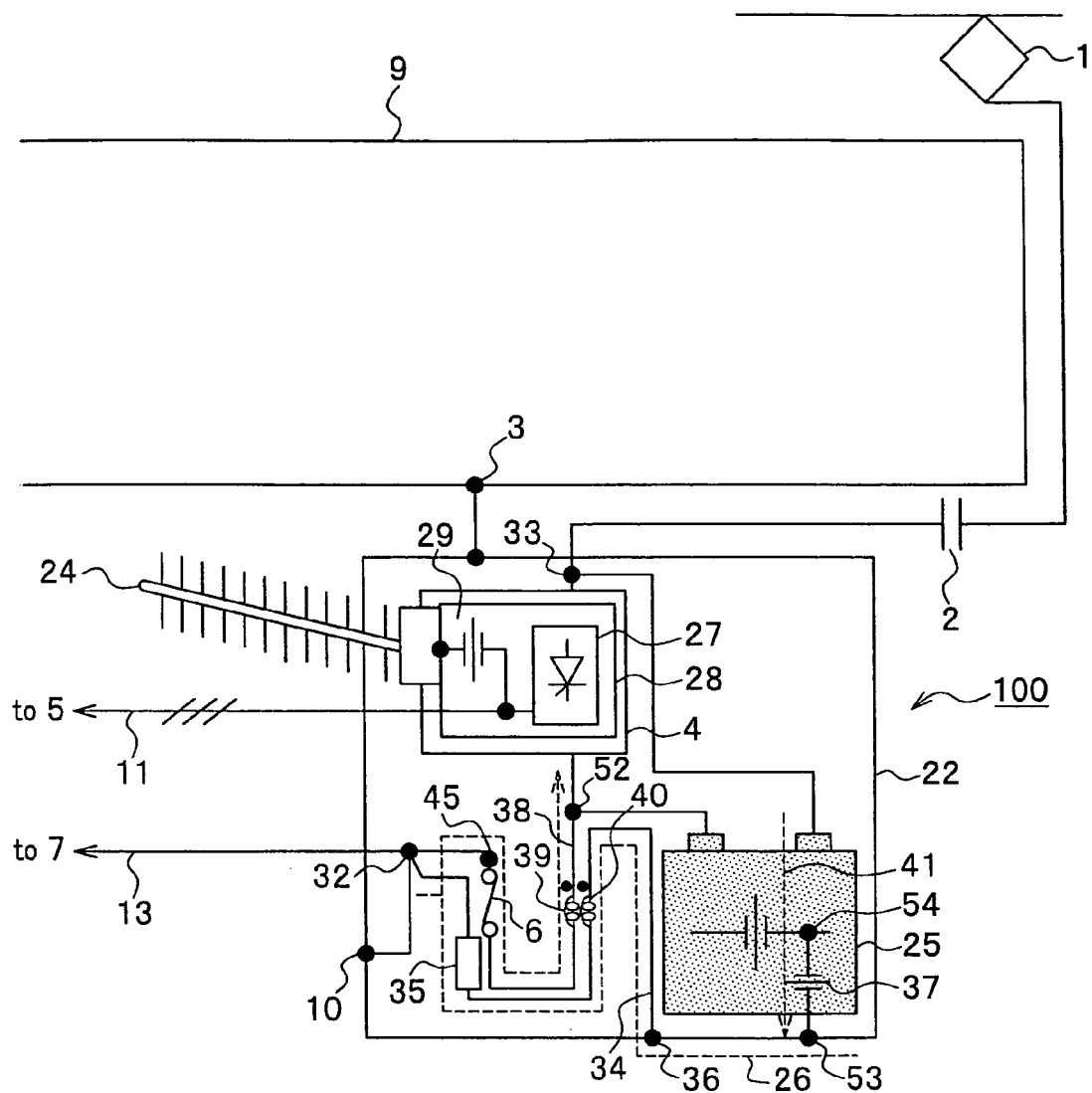
FIG. 3 is a drawing showing a third embodiment of the present invention.

FIG. 3 shows a third embodiment of the present invention. A point different from FIG. 1 is one that a connection point 45 of a negative-pole side of a grounding switch 6 provided mainly for an isolation voltage resistance test is used as a connection destination of the conducting wire 34 instead of the negative pole terminal 32. Thus shortening a path of the high-frequency current 26, an impedance can be reduced. Here calculate reduction percent of the impedance. Provide that the busbar 38 is two meters and the grounding switch 6 is located at a one-meter position at middle. In addition, provide that an inductance per a unit length is 1 μH/m and a coupling coefficient of the parasitic inductance 39 of the busbar 38 and the parasitic inductance 40 of the conducting wire 34 is 0.8. An impedance Z3 becomes:

$$Z3=2\times\pi\times 1\times 1\times 10^6\times 2\times 10^{-6}\times(1-0.8)\approx 1.75\ \Omega,$$

at 1 MHz of the high-frequency current 26 when the conducting wire 34 is connected to the connection point 45 of the negative-pole side of the grounding switch 6; and thus the inductance reduces by 50%. Thus lowering the impedance, the high-frequency current 26 can be recovered.

Figure 4:
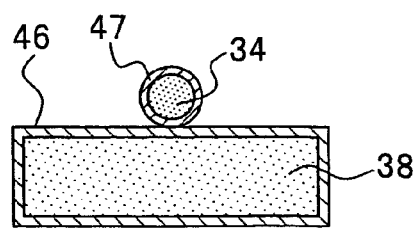
FIG. 4 is a partial section drawing of an embodiment of the present invention.

In FIG. 4 is shown a state by a section, where the conducting wire 34 abuts the busbar 38 through an isolator 46 of the busbar 38 and an isolator 47 of the conducting wire 34 contacting the isolator 46. In this example a conductor is configured of one piece of the conducting wire 34.

Figure 5:
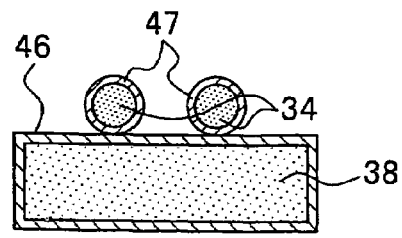
FIG. 5 is a partial section drawing of an embodiment of the present invention.

In FIG. 5 is shown a partial section view of the conducting wire 34 and busbar 38 of the embodiment of the present invention. A point different from the example shown in FIG. 4 is that pieces of the conducting wire 34 are made two. Thus an inductance of a path of the high-frequency current 26 can be reduced. If although in FIG. 5 the pieces are two, they are further increased, the inductance can be further reduced.

Figure 6:
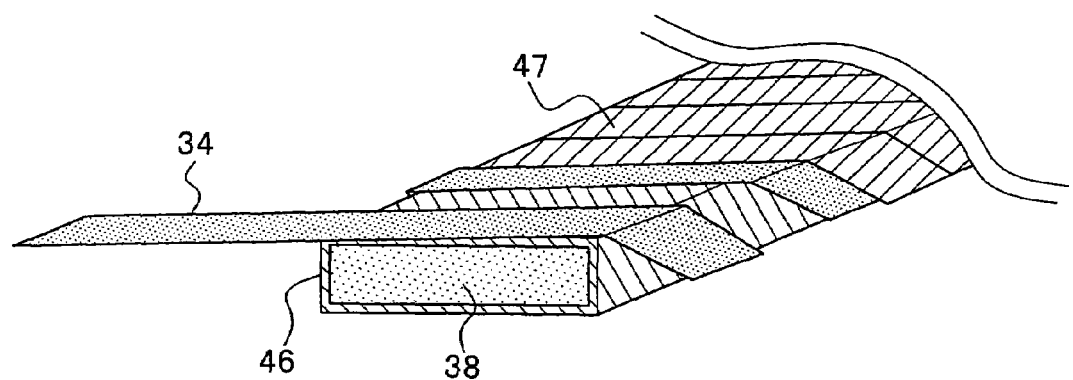
FIG. 6 is a partial structural drawing of an embodiment of the present invention.

In FIG. 6 is shown a partial section view of the conducting wire 34 and busbar 38 of the embodiment of the present invention. A point different from the example shown in FIG. 4 is that a conducting wire of a tape form is used as the conducting wire 34. Thus an inductance of a path of the high-frequency current 26 can be reduced.

Figure 7:
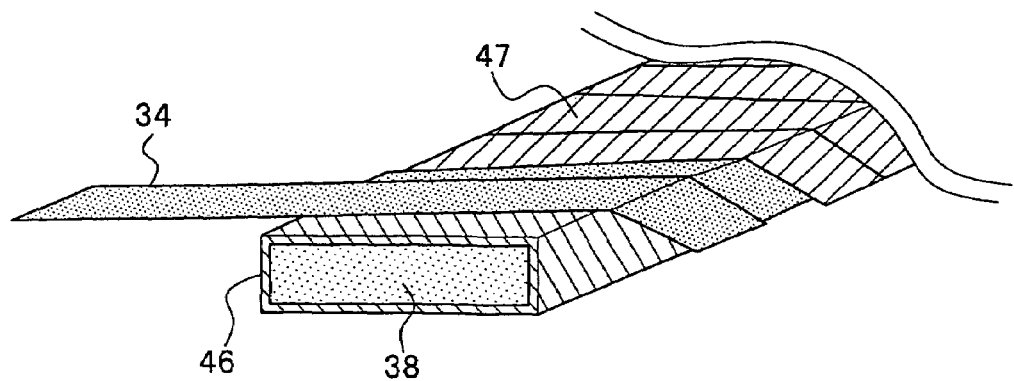
FIG. 7 is a partial structural drawing of an embodiment of the present invention.

In FIG. 7 is shown a partial section view of the conducting wire 34 and busbar 38 of the embodiment of the present invention. A point different from the example shown in FIG. 4 is that the conducting wire 34 of a tape form is overlappingly wound. Thus an inductance of a path of the high-frequency current 26 can be reduced.

In accordance with the configurations thus described the power converter 100 shown next can be provided:

A power converter that is connected between a DC power source and a load and controls power to the load by a semiconductor switching, wherein the housing 22 and negative pole 32 of a power-source side of the power converter are electrically connected through the resistor 35;

Another power converter that is connected between a DC power source and a load and controls power to the load by the switching equipment 4, wherein the conducting wire 34, which connects the housing 22 and negative pole 32 of the power converter through the resistor 35, is insulatingly provided to the busbar 38 connecting the negative pole 32 of the power converter and the switching equipment 4;

Still another power converter that comprises the filter condenser 25, which is connected in parallel with a DC power source and the switching equipment 4 within the housing 22 of the power converter and suppresses a voltage fluctuation, wherein a housing portion adjacent to the filter condenser 25 and the negative pole 32 of the power converter are electrical connected through the resistor 35;

Yet another power converter that comprises the switching equipment 4 and the cooling equipment 24 within the housing 22 of the power converter, wherein the housing 22 adjacent to the cooling equipment 24 and the negative pole 32 of the power converter are electrical connected through the resistor 35;

Yet still another power converter that comprises the grounding switch 6 mainly for an isolation voltage resistance test between the negative pole 32 of the power converter and the switching equipment 4 within the housing 22 of the power converter, wherein the housing 22 of the power converter and the negative pole 45 of the grounding switch 6 are electrical connected through the resistor 35;

Further another power converter that is connected between a DC current and a load and controls power to the load by the switching equipment 4, wherein the housing 22 of the power converter and the negative pole 32 of a power-source side the power converter are electrical connected by a plurality of the conducting wire 34 through the resistor 35;

Further still another power converter that is connected between a DC current and a load and controls power to the load by the switching equipment 4, wherein the housing 22 of the power converter and the negative pole 32 of a power-source side of the power converter are electrical connected while spirally winding the conducting wire 34 of a tape form to the busbar 38 through the resistor 35;

Further yet another power converter that is connected between a DC current and a load and controls power to the load by the switching equipment 4, wherein the housing 22 of the power converter and the negative pole 32 of a power-source side of the power converter are electrical connected by the conducting wire 34 and are arranged adjacent to a first conductor (busbar 38) so that the parasitic inductance 40 of the conducting wire 34 couples the parasitic inductance 39 of the busbar 38.

In addition, another power converter that is connected between a DC current and a load and controls power to the load by the switching equipment 4, wherein the housing 22 of the power converter and the negative pole 32 of a power-source side of the power converter are electrical connected by the conducting wire 34 and are arranged adjacent to the first conductor so that the parasitic inductance 40 of the conducting wire 34 couples the parasitic inductance 39 of the busbar 38; and In addition, still another power converter that recovers a high-frequency current, which leaks from a parasitic capacitance of the filter condenser 25 within the housing 22 of the power converter, through the conducting wire 34.

Figure 8:
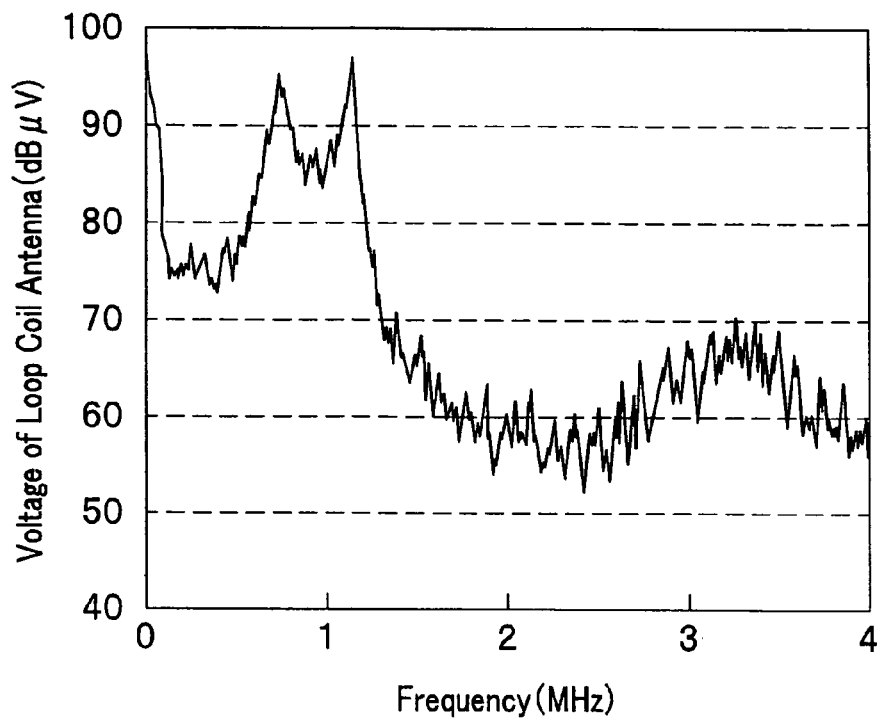
FIG. 8 is a drawing showing a measurement result of electric waves within a vehicle in a conventional technology.
Figure 9:
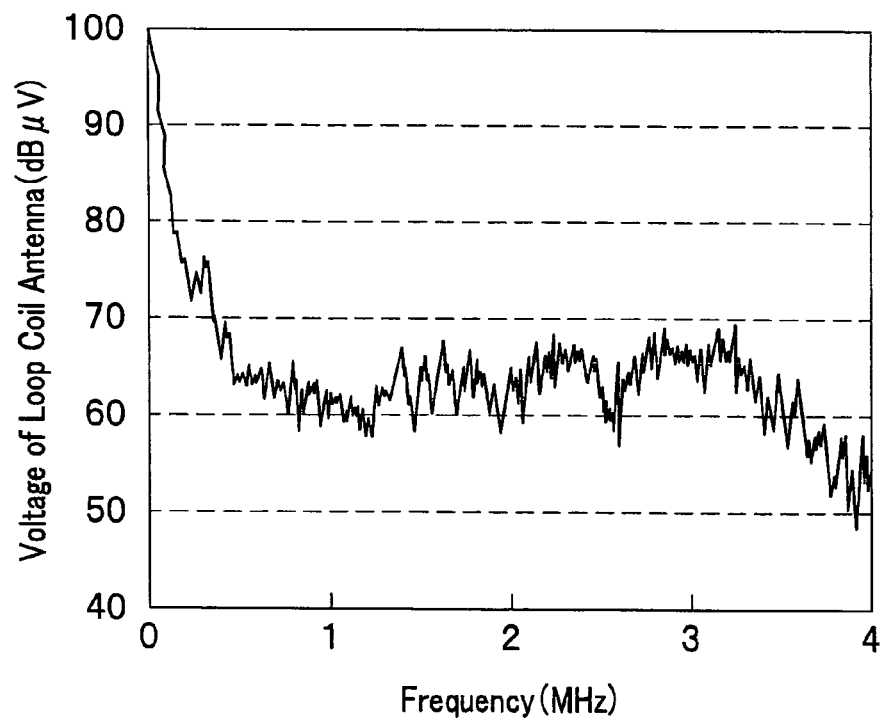
FIG. 9 is a drawing showing a measurement result of electric waves within a vehicle when the present invention is implemented.

Next will be described a result of testing an effect when the embodiments are applied. A measurement of the induced interference is performed by placing a loop antenna within a vehicle and comparing voltage intensities induced in the loop antenna for receiving electric waves. In FIG. 8 is shown an example before the embodiment is applied; in FIG. 9 is shown a result where the embodiment is applied. Comparing voltages at 1 MHz, it turns out that there is a reduction effect of 35 dB.

Although descriptions of the present invention are made with exemplifying an electric vehicle, the invention is not limited thereto. If a power converter is one for controlling power to a load by a semiconductor switching, it can be made to reduce an interference to external appliances of the power converter by applying the present invention.

What is claimed is:

1. A power converter connected between a direct current power source and for controlling power to a load by switching equipment, comprising:
 a first conductor for connecting a grounding conductor and said switching equipment; and
 a second conductor with an associated resistor for connecting a housing of said power converter and a negative pole of said power converter to said first conductor, said second conductor abutting a busbar operatively connected with switching equipment and said grounding conductor.

2. A power converter connected between a direct current power source and for controlling power to a load by switching equipment, comprising:
 a first conductor for connecting a grounding conductor and said switching equipment;
 a second conductor with an associated resistor for connecting a housing of said power converter and the grounding conductor to said first conductor,
 wherein said second conductor is arranged in abutting but isolated relationship with said first conductor.

3. A power converter according to claim 2, further comprising a filter condenser within a housing of a power converter, wherein said filter condenser is connected in parallel with a DC power source and switching equipment and suppresses a voltage fluctuation, with said second conductor being connected to a housing portion located adjacent to the filter condenser.

4. A power converter according to claim 2, further comprising cooling equipment for cooling said switching equipment, wherein said second conductor is connected to a portion of said housing located adjacent to said cooling equipment.

5. A power converter according to claim 2, further comprising a grounding switch at said first conductor, wherein said second conductor is connected to a housing of the power converter and a negative-pole-side portion of the grounding switch.

6. A power converter according to claim 2, wherein a plurality of conducting wires comprises said second conductor.

7. A power converter according to claim 2, wherein a conducting wire of a tape form comprises said second conductor and is arranged along said first conductor through an insulator.

8. A power converter according to claim 7, wherein said second conductor of a tape form is spirally wound on said first conductor.

9. A power converter connected between a direct current power source and for controlling power to a load by switching equipment, comprising:
 a first conductor for connecting a grounding conductor and said switching equipment;
 a second conductor with an associated resistor for connecting a housing of said power converter and said grounding conductor to said first conductor,
 wherein the second conductor is arranged adjacent to the first conductor so that a parasitic inductance of the second conductor couples a parasitic inductance of the first conductor.

10. A power converter according to claim 9, wherein high-frequency current is recoverable through said second conductor, the high-frequency current leaking to a housing of the power converter through a parasitic capacitance of a filter condenser provided within the housing.

11. A power converter according to claim 9, wherein an inductance of a path of a high-frequency current flowing in said first conductor and said second conductor is not more than a half of an inductance of a path of another high-frequency current flowing the first conductor and a housing.

* * * * *